United States Patent [19]

Jensen

[11] 4,326,381
[45] Apr. 27, 1982

[54] SOLAR ENGINE

[75] Inventor: Ronald N. Jensen, Hampton, Va.

[73] Assignee: The United States of America as represented by the Administrator of the National Aeronautics and Space Administration, Washington, D.C.

[21] Appl. No.: 51,275

[22] Filed: Jun. 22, 1979

[51] Int. Cl.³ .................................. F03G 7/02
[52] U.S. Cl. .................... 60/641.14; 60/516
[58] Field of Search ............... 60/516, 517, 641, 650, 60/682, 669, 641 AB, 641 AC, 641 AD, 526; 62/6

[56] References Cited

U.S. PATENT DOCUMENTS

| | | | |
|---|---|---|---|
| 538,068 | 4/1895 | Denney | 60/517 |
| 1,424,932 | 8/1922 | Moreau | 60/682 |
| 3,029,596 | 4/1962 | Hanold et al. | 62/6 X |
| 3,117,414 | 1/1964 | Daniels et al. | 60/526 |
| 3,364,676 | 1/1968 | Miller | 60/641 |
| 3,972,651 | 8/1976 | Fletcher et al. | 60/517 X |
| 4,081,967 | 4/1978 | de Geus | 60/641 AB |
| 4,173,123 | 11/1979 | Gurtler | 60/641 AD |

FOREIGN PATENT DOCUMENTS 2424315  11/1975  Fed. Rep. of Germany ........ 60/641

Primary Examiner—Allen M. Ostrager
Assistant Examiner—Stephen F. Husar
Attorney, Agent, or Firm—Howard J. Osborn; John R. Manning

[57] ABSTRACT

A solar engine is disclosed in which a fluid, which is first heated and then cooled, forces a piston outward as the fluid is heated, and then draws the piston inward as the fluid is cooled. The piston is connected to a shaft and produces work as it moves outward and inward. A displacer plate moves between an absorber plate and a cooling plate to form an air space between the displacer and one or the other of these two plates for heating and cooling the fluid. The displacer plate is moved from one plate to the other by the displacer push ring as the piston nears the midpoint of its travel on the outward stroke and again on the inward stroke.

11 Claims, 5 Drawing Figures

SOLAR ENGINE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to power generating means and more particularly concerns a solar engine device for converting the energy of sunlight into mechanical energy.

DESCRIPTION OF THE PRIOR ART

A variety of devices have been proposed for converting solar energy into mechanical energy. One such device concentrates solar energy or chambers mounted on a drum. As the chambers are heated, expandable fluid forces heavier, nonexpandable fluid out of the chambers and into the drum, making those chambers exposed to solar energy lighter than those chambers not exposed to solar energy. The difference in weight of the chambers mounted on the periphery of the drum causes the drum to rotate, producing work. This type of design requires concentration of the solar energy and is somewhat complicated.

Another apparatus for converting solar energy into mechanical energy has thermally actuated pump units mounted on a rotating structure. A focusing means concentrates solar rays on a number of the pump units causing the expansion of material contained in each unit, resulting in the extension of a piston rod in the pump units, which forces a transfer of fluid to a high pressure accumulator. When the rotating structure removes the pump units from under the focusing means, the pump units cool, the expansible material contracts and fluid re-enters the piston assemblies from a reservoir. The fluid in the high pressure accumulator is used for operating hydraulic motors or the like. This design is also complicated and requires means for focusing solar energy.

It is therefore an object of the present invention to to provide a flat plate type solar engine that is less complex than previous solar energy devices.

A further object of the present invention is to provide a solar engine that will operate at a relatively low temperature differential.

SUMMARY OF THE INVENTION

According to the present invention, the foregoing and other objects are attained by providing a solar engine constructed as follows. An absorber plate, heated by solar energy, transfers the heat to air behind the absorber plate. As the air behind the absorber plate is heated it expands, forcing a piston, mounted in a power cylinder in the face of the absorber plate, outward. As the piston approaches the midpoint of its travel, it pulls a displacer against the inside face of the absorber plate. An air pocket is now formed between the displacer and a cooling plate.

The air in contact with the cooling plate is now cooled as the cooling plate radiates heat into the shadow area behind the solar engine. As the piston nears the midpoint of its inward travel, it pushes the displacer plate against the cooling plate forming an air pocket between the displacer and the absorber plate. The cycle is then ready to begin again. Useful work is produced by the outward and inward motion of the piston.

BRIEF DESCRIPTION OF THE DRAWINGS

A more complete appreciation of the invention and many of the attendant advantages thereof will be readily apparent by reference to the following detailed description when considered in connection with the accompanying drawings wherein.

DESCRIPTION OF THE PREFERRED EMBODIMENT

Figure 1:
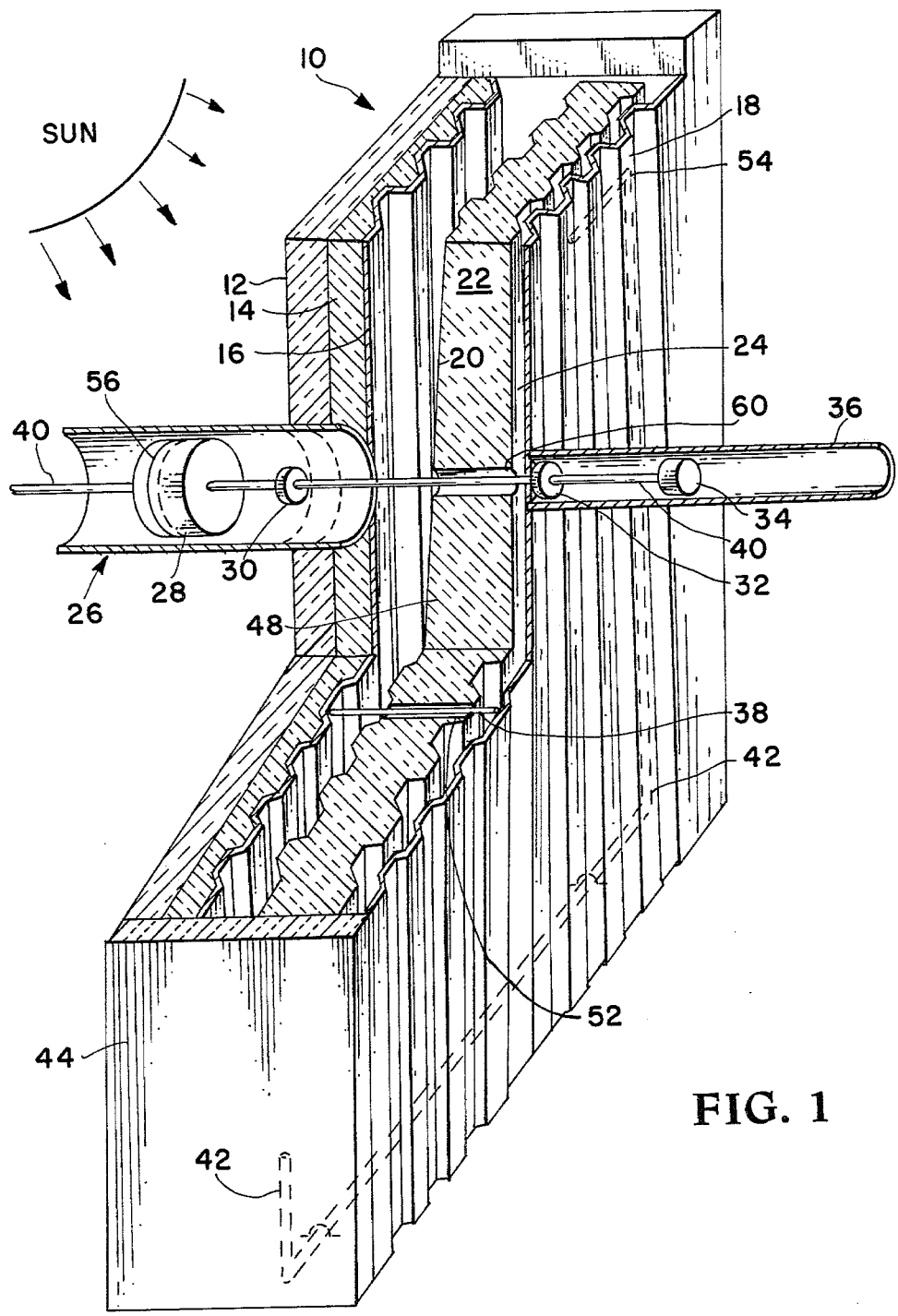
FIG. 1 is a perspective view, partially in section, of the solar engine according to the present invention.

Referring now more particularly to the drawings and specifically to FIG. 1, there is illustrated a preferred embodiment of the present invention as it would be used in a solar engine and as designated generally by the numeral 10. Solar engine 10 has four major components, an absorber plate 16, a cooling plate 18, a displacer 48 and a piston 28.

The absorber plate 16 and the cooling plate 18 are corrugated to provide a larger area for heat transfer and for rigidity. The absorber plate 16 has a transparent sheet 12 and a transparent cover 14 on its outer face. Transparent sheet 12 and cover 14 allow solar energy to pass through to absorber plate 16, but resists radiation of thermal energy from the absorber plate 16. The transparent sheet 12 and cover 14 may be either plastic or glass or other transparent material, but in the preferred embodiment are glass. The absorber plate 16 and the cooling plate 18 are of corrugated metal for ease of construction.

The displacer 48 is thicker at the bottom than at the top. Since the displacer 48 is pivoted near its top at 54 this weight distribution allows gravity to force displacer cool side 24 against the inside face of cooling plate 18 when the solar engine 10 is on the heating portion of the cycle as shown in FIG. 1. Thus, the displacer cool side 24 is being cooled by contact with cooling plate 18 while the air between absorber plate 16 and displacer hot side 20 is being heated. When displacer 48 is moved away from cooling plate 18 at the start of the cooling portion of the cycle, heat is transferred from the air by both the cooling plate 18 and the displacer cool side 24.

Similarly, during the cooling portion of the cycle, the displacer hot side 20 rests against the inside face of absorber plate 16. Thus, the displacer hot side 20 is being heated by absorber plate 16 while the air between displacer cool side 24 and cooling plate 18 is being cooled. When displacer 48 is moved away from absorber plate 16 at the start of the heating cycle, heat is transferred to the air by both the absorber plate 16 and the displacer hot side 20.

The interior of displacer 48 is airtight and is filled with an insulating material 22 to prevent the transfer of heat from displacer hot side 20 to displacer cool side 24.

Displacer 48 is supported at pivot point 54 by displacer support 42. Displacer support 42 is attached to the displacer 48 high on the side of displacer 48 and point 54, so that once displacer 48 is moved past the vertical by displacer push ring 30 or displacer push ring 32, gravity will force displacer 48 against absorber plate 16 or cooling plate 18.

Power cylinder 26 penetrates absorber plate 16 and is approximately perpendicular to absorber plate 16. Power cylinder 26 is located approximately two-thirds of the way up on the absorber plate 16 and lies on a common axis with power rod slide cylinder 36 which is similarly mounted on cooling plate 18.

Piston 28 is mounted in power cylinder 26. A seal is maintained between power cylinder 26 and piston 28 by seal 56. A power rod 40 connects piston 28 and a power rod positioner 34 located in power rod slide cylinder 36. The power rod positioner 34 maintains power rod 40 aligned with the centerline of power cylinder 26 and power rod slide cylinder 36. A displacer push ring 30 is fixed on the power rod 40 on the absorber side of displacer 48 and a displacer push ring 32 is fixed on the power rod 40 on the cooling side of displacer 48. The power rod 40 is not connected to the displacer 48 and passes through displacer 48 at opening 60.

Figure 2:
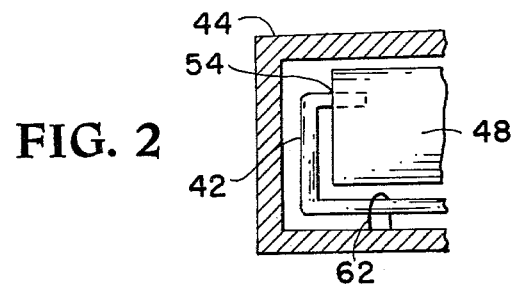
FIG. 2 is a schematic view from the rear, partially cut away, of the invention shown in FIG. 1.

FIG. 2 is a schematic view of solar engine 10, viewed from the rear, with the rear part of insulated case 44 removed. Displacer 48 is supported by displacer support 42 which is pivoted to displacer 48 and at point 54. Displacer support 42 is attached to insulated case 44 by displacer support anchor 62. Since displacer 48 is wider at the base than at the top, and since the displacer support 42 is attached high on the displacer 48 at point 54, after displacer moves past the midpoint on each cycle, gravity will force the displacer 48 the rest of the way and hold it against absorber plate 16 or cooling plate 18.

Figure 3:
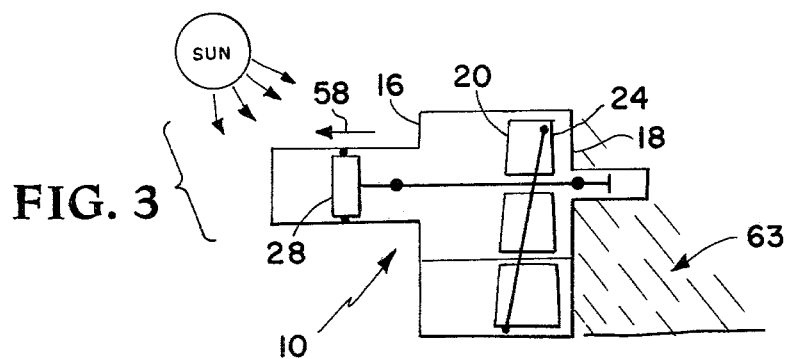
FIG. 3 is a schematic view of the invention shown in FIG. 1 with the piston moving outward.

FIG. 3 is a schematic view of solar engine 10 during a heating portion of the cycle. Absorber plate 16 and displacer hot side 20 are transferring heat to the air between displacer hot side 20 and absorber plate 16. The air expands as it is heated creating pressure on the displacer side of piston 28 which is higher than the atmospheric pressure on the other side of piston 28, thus forcing piston 28 in the direction of arrow 58. Displacer cool side 24 is resting against cooling plate 18 and cooling plate 18 is transferring heat from displacer cool side 24 into the shadow area 63.

Figure 4:
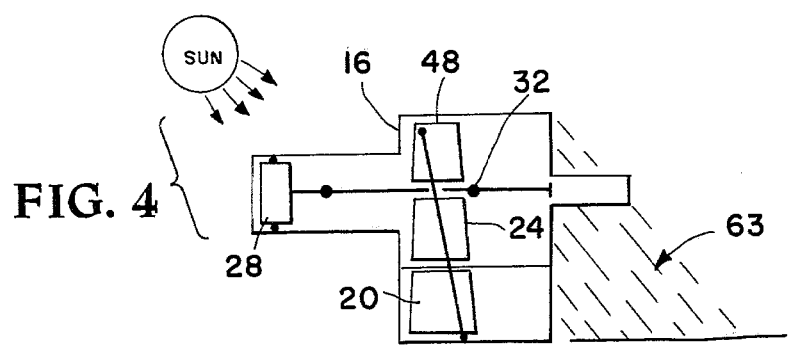
FIG. 4 is a schematic view of the invention shown in FIG. 1 with the piston at the outer most extent of its travel.

In FIG. 4 piston 28 has moved to the outer limit of its travel. Displacer push ring 32 has pulled the displacer 48 against absorber plate 16. Heat is now transferred from the air in the space between cooling plate 18 and displacer cool side 24, to displacer cool side 24 and to cooling plate 18. The air begins to contract as it is cooled. Absorber plate 16 is heating displacer hot side 20.

Figure 5:
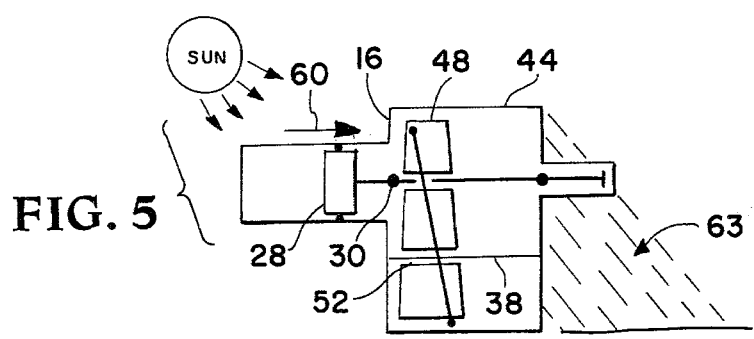
FIG. 5 is a schematic view of the invention shown in FIG. 1 with the piston moving inward.

In FIG. 5 piston 28 is being drawn inward, as shown by arrow 60, as the air in solar engine 10 cools and contracts, since atmospheric pressure on the outside of piston 28 is greater than pressure inside solar engine 10. Displacer push ring 30 has made contact with displacer 48 and has started to move displacer 48 in the direction of arrow 60. Displacer 48 is smaller than the insulated case 44 so that there is no pressure rise as displacer 48 is shifted from the absorber plate 16 to cooling plate 18. Also, holes 52, at points where plate spacers 38 penetrate displacer 48, allow passage of air as displacer 48 moves from one position to another.

It is thus seen that a solar engine according to the present invention is of simple construction and will run at a lower temperature differential than most air engines.

It will be understood that the foregoing description is of the preferred embodiment of the invention and is therefore merely representative. Obviously there are many variations and modifications of the present invention in light of the above teachings that will be readily apparent to those skilled in the art. It is therefore to be understood that within the scope of the appended claims the invention may be practiced otherwise than as specifically described.

What is claimed as new and desired to be secured by Letters Patent of the United States is:

1. A solar engine comprising:
    solar engine housing means containing a working fluid;
    said engine housing means having a reaction surface housing means and a displacer housing means;
    said displacer housing means including therein an absorber plate and a cooling plate;
    displacer means pivotally disposed within said displacer housing means;
    said displacer means adapted to alternately insulate said absorber plate and cooling plate from said working fluid;
    said reaction surface housing means communicating with said displacer housing means;
    said reaction surface means slidably disposed within said reaction surface housing means and engaging and pivoting said displacer means;
    said working fluid alternately being directly heated in said housing means by solar energy radiated through said absorber plate and cooled by said cooling plate through the movement of said displacer means to reciprocate said reaction surface means and produce work.

2. A solar engine as in claim 1 wherein the fluid is cooled by radiating heat into an area in the shadow of said housing means.

3. A solar engine as in claim 1 wherein the fluid that is heated and cooled is air.

4. A solar engine as in claim 1 wherein the solar heat is absorbed by a corrugated absorber plate on the sunlight side of said housing means.

5. A solar engine as in claim 1 wherein the solar engine is cooled by radiation from a corrugated cooling plate in the shadow area of said housing means.

6. A solar engine as in claim 1 wherein said absorber plate is covered by a material which allows passage of sunlight but resists passage of thermal radiation.

7. A solar engine as in claim 6 wherein said material is glass.

8. A solar engine as in claim 6 wherein said material is plastic.

9. A solar engine as in claim 5 wherein said displacer is corrugated on each face to fit snugly against said cooling plate during a heating cycle and against said absorber plate on a cooling cycle.

10. A solar engine comprising:
    an absorber plate which is heated by sunlight and which transmits the heat to a fluid on the opposite side of said absorber plate;
    a cooling plate on the shadow side of and parallel to said absorber plate which transmits heat from the fluid on the side of said cooling plate located closest to said absorber plate, to the shadow side of said cooling plate;

a displacer, located between said absorber plate and said cooling plate, which alternately rests flush against the inside face of said absorber plate and the inside face of said cooling plate, and alternately forms an air space between said displacer plate and the inside face of the plate it is not resting flush against;

a power cylinder penetrating said absorber plate and lying perpendicular to said absorber plate, the inner edge of said power cylinder being flush with the inner face of said absorber plate;

a power rod slide cylinder penetrating said cooling plate and lying perpendicular to said cooling plate, the inner edge of said power rod slide cylinder being flush with the inner face of said cooling plate;

a power rod extending from the approximately midpoint of said power rod slide cylinder, through an opening in said displacer, through said power cylinder;

a piston concentric to and attached to said power rod on the portion that passes through said power cylinder and which is forced outward as the fluid is heated by said absorber plate and is drawn inward as the fluid is cooled by said cooling plate;

a cool side displacer push ring attached to said power rod, which pulls said displacer from a position of resting flush against said cooling plate to a position of resting flush against said absorber plate, as said piston is forced outward as the fluid is heated by said absorber plate;

a hot side displacer push ring, attached to said power rod, which pushes said displacer from a position of resting flush against said absorber plate to a position of resting against said cooling plate as said piston is drawn inward as the fluid is cooled by said cooling plate; and a pivot support means that shifts the position of said displacer from flush with said cooling plate to flush with said absorber plate, and back again, after said displacer is set in motion by said cool side displacer push ring or said hot side displacer push ring.

11. A solar engine as in claim 10 wherein one or more reflecting surfaces are placed to reflect solar energy on said absorber plate.

* * * * *